US012569826B2

(12) United States Patent
Narayanan et al.

(10) Patent No.: US 12,569,826 B2
(45) Date of Patent: Mar. 10, 2026

(54) ADSORBENT MIXTURE FOR DEPLETING ANTIBIOTICS, PATHOGENS, AND HEAVY METALS

(71) Applicant: FOUNDATION FOR NEGLECTED DISEASE RESEARCH, Bangalore (IN)

(72) Inventors: Shridhar Narayanan, Bangalore (IN); R K Shandil, Bangalore (IN); Saumya Dhup Gulati, Bangalore (IN); Siva Shanmugam Selvaraj, Bangalore (IN)

(73) Assignee: FOUNDATION FOR NEGLECTED DISEASE RESEARCH, Bangalore (IN)

( * ) Notice: Subject to any disclaimer, the term of this patent is extended or adjusted under 35 U.S.C. 154(b) by 577 days.

(21) Appl. No.: 18/013,013

(22) PCT Filed: Jun. 29, 2021

(86) PCT No.: PCT/IB2021/055795
§ 371 (c)(1),
(2) Date: Dec. 27, 2022

(87) PCT Pub. No.: WO2022/003552
PCT Pub. Date: Jan. 6, 2022

(65) Prior Publication Data
US 2023/0241578 A1     Aug. 3, 2023

(30) Foreign Application Priority Data
Jul. 2, 2020     (IN) .............................. 202041028117

(51) Int. Cl.
*B01J 20/20*     (2006.01)
*B01J 20/10*     (2006.01)
(Continued)

(52) U.S. Cl.
CPC ............. *B01J 20/20* (2013.01); *B01J 20/103* (2013.01); *B01J 20/262* (2013.01);
(Continued)

(58) Field of Classification Search
None
See application file for complete search history.

(56) References Cited

U.S. PATENT DOCUMENTS 3,377,271 A * 4/1968 Cann ..................... C02F 1/5236
                                                                           423/101
3,377,272 A * 4/1968 Cann ...................... C02F 11/08
                                                                           423/632
(Continued)

FOREIGN PATENT DOCUMENTS

WO        2001087777 A2     11/2001
WO        2001087777 A3     3/2002

OTHER PUBLICATIONS

Ahmed, et al., Adsorption of quinolone, tetracycline, and penicillin antibiotics from aqueous solution using activated carbons, Review. Environmental Toxicology and Pharmacology, vol. 50, pp. 1-10, Oct. 2017, http://dx.doi.org/10.1016/j.etap.2017.01.004.
(Continued)

*Primary Examiner* — John J Figueroa
(74) *Attorney, Agent, or Firm* — CANTOR COLBURN LLP

(57) ABSTRACT

The present invention provides a mixture of adsorbents which has the capacity to adsorb high concentrations of antibiotics from a diverse range of classes, pathogens, and heavy metals. The invention is a mixture of various charcoal adsorbents including areca nut, bamboo, pine nut, coconut shell and paper that can deplete a wide variety of antibiotics in one go.

11 Claims, 2 Drawing Sheets

Treatment device

Untreated water with pollutants/antibiotics in

ETP

Waste sludge

Pre-filter     Adsorbent

(51) Int. Cl.

| | |
|---|---|
| *B01J 20/26* | (2006.01) |
| *B01J 20/28* | (2006.01) |
| *C02F 1/28* | (2023.01) |
| *C02F 1/42* | (2023.01) |
| *C02F 101/14* | (2006.01) |
| *C02F 101/22* | (2006.01) |
| *C02F 103/00* | (2006.01) |

(52) U.S. Cl.

CPC ......... *B01J 20/28052* (2013.01); *C02F 1/288* (2013.01); *C02F 1/42* (2013.01); *B01J 2220/4825* (2013.01); *B01J 2220/4831* (2013.01); *B01J 2220/4881* (2013.01); *C02F 1/283* (2013.01); *C02F 2101/14* (2013.01); *C02F 2101/22* (2013.01); *C02F 2103/003* (2013.01); *C02F 2303/04* (2013.01)

(56) References Cited

U.S. PATENT DOCUMENTS

| | | | | |
|---|---|---|---|---|
| 3,450,508 A | * | 6/1969 | Cooper | B01D 61/243 |
| | | | | 423/6 |
| 5,186,914 A | * | 2/1993 | Yoshihiro | B01D 53/04 |
| | | | | 423/239.1 |
| 5,438,029 A | * | 8/1995 | Kobata | B03C 3/41 |
| | | | | 502/430 |
| 5,494,500 A | * | 2/1996 | Ikenaga | C05D 9/00 |
| | | | | 96/150 |
| 5,512,178 A | * | 4/1996 | Dempo | C02F 1/78 |
| | | | | 210/182 |
| 6,299,771 B1 | | 10/2001 | Shmidt et al. | |
| 9,878,356 B2 | * | 1/2018 | De Leij | B01J 20/06 |
| 2010/0099782 A1 | * | 4/2010 | Lee | C08L 51/003 |
| | | | | 977/750 |

OTHER PUBLICATIONS

Berges, et al., Antibiotics removal from aquatic environments: adsorption of enrofloxacin, trimethoprim, sulfadiazine, and amoxicillin on vegetal powdered activated carbon, Environmental Science and Pollution Research, Oct. 2020, pp. 1-11.

Brown, et al., Occurrence of antibiotics in hospital, residential, and dairy effluent, municipal wastewater, and the Rio Grande in New Mexico, Science of the Total Environment 366 ( Jan. 2006) 772-783.

Choudhury, et al., Emergence and dissemination of antibiotic resistance: A global problem, Indian Journal of Medical Microbiology, (Dec. 2012) 30(4): 384-90.

Diwan, et al., Antibiotics and antibiotic-resistant bacteria in waters associated with a hospital in Ujjain, India, BMC Public Health Jul. 2010, 10:414.

WHO, Global Action Plan on Antimicrobial Resistance, Dec. 2015.

Wu, et al., Enhanced Removal of Antibiotic in Wastewater Using Liquid Nitrogen-Treated Carbon Material: Material Properties and Removal Mechanisms, Int. J. Environ. Res. Public Health Nov. 2018, 15, 2652.

Yu, et al., Removal of Antibiotics from Aqueous Solutions by a Carbon Adsorbent Derived from Protein-Waste-Doped Biomass, ACS Omega Jul. 2020, 5, 19187-19193.

Zhang, et al., Performance evaluation of powdered activated carbon for removing 28 types of antibiotics from water, Journal of Environmental Management 172 (Feb. 2016) 193-200.

D. A. Odubiyi et al. , "Wastewater Treatment with 2 Activated Charcoal Produced from Cocoa Pod Husk", International Journal of Environment and Bioenergy, 2012, 4 (3) : 162-175, ISSN: 2165-8951.

Barancheshme F, Munir M. Strategies to Combat Antibiotic Resistance in the Wastewater Treatment Plants. Front Microbiol. Jan. 17, 2018;8:2603. doi: 10.3389/fmicb.2017.02603. PMID: 29387043; PMCID: PMC5776126.

International Search Report and Written Opinion for PCT/IB2021/055795 dated Sep. 30, 2021.

* cited by examiner

FIG. 1A
FIG. 1B
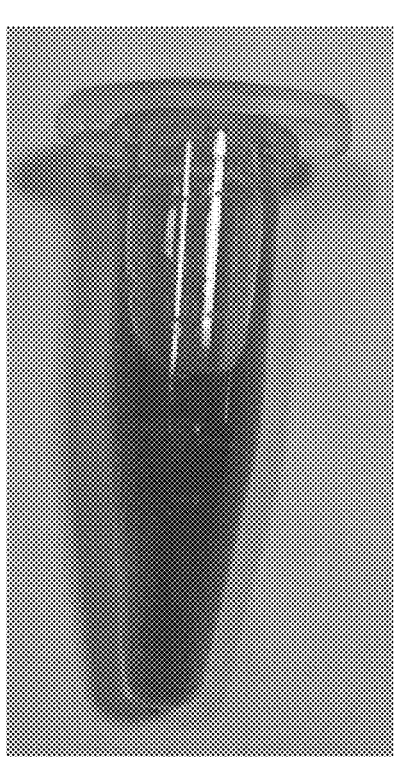
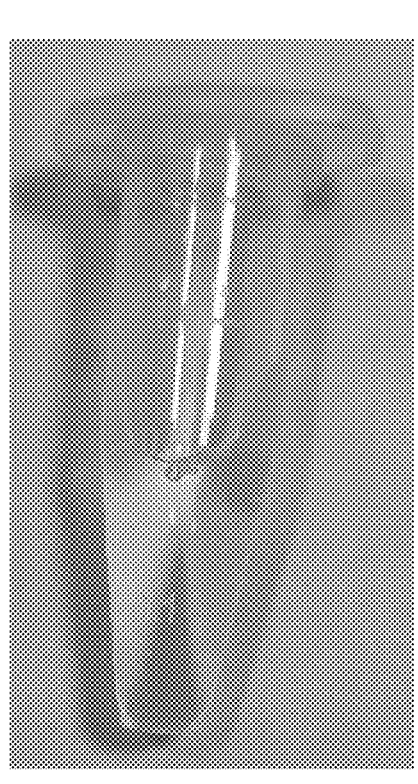

1

ADSORBENT MIXTURE FOR DEPLETING ANTIBIOTICS, PATHOGENS, AND HEAVY METALS

CROSS-REFERENCE TO RELATED APPLICATIONS

This application is a National Stage entry of International Patent Application No. PCT/IB2021/055795, filed 29 Jun. 2021 and published as International Patent Application Publication No. WO 2022/003552 A1, which claims priority to and benefit from the Indian Provisional Application 20/204,1028117 filed on Jul. 2, 2020, each of which is incorporated by reference herein in its entirety.

FIELD OF INVENTION

The present invention is related to a mixture of adsorbents which has the capacity to adsorb high concentrations of antibiotics belonging to a diverse range of chemical classes, pathogens and heavy metals.

BACKGROUND OF THE INVENTION

Waste-water effluents from different sources including hospitals have been reported to have several antibiotics, especially a high load of fluoroquinolones (up to 256 µg/L) (BMC Public Health, 2010; 10, Article number: 414).

World Health Organisation (WHO) has raised concern on increasing resistance in the microbes. Along with over-use of antibiotics one of the reasons cited is residual antibiotics in environment especially, waste-water (WHO, 2020 https://www.who.int/news-room/fact-sheets/detail/antimicrobial-resistance). Globally, multiple studies that screened hospital waste-water have found a major load of fluoroquinolones (Indian Journal of Medical Microbiology, (2012) 30(4): 384-90; Science of Total Environment, 2006; 366 (2-3), 772-783).

The key challenge is the removal of antibiotics with ease and cost-effective methods from the waste-water. To address this issue, applicants have developed a mixture of adsorbents which has the capacity to adsorb high concentrations of various antibiotics from a diverse range of chemical classes. Prior arts have shown adsorbents that can deplete antibiotics at various concentrations (Review. Environ Toxicol Pharmacol. 2017, 50:1-10; ACS Omega, 2020, 5(30): 19187-19193; Environ. Scien. and Pollution Research. 28; 8442-8452). Xinbo Zhang et al (J Environ Manage. 2020, 1; 172:193-200) in their study evaluate the performance of powdered activated charcoal for 6 representative groups of 28 antibiotics, namely Tetracyclines (TCs), Macrolides (MCs), Chloramphenicols (CPs), Penicillins (PNs), Sulfonamides (SAs) and Quinolones (QNs). According to the results, the single powdered activated charcoal (PAC) could efficiently adsorb 28 antibiotics at optimum conditions (room temperature and acidic pH) with the contact time of 120 min. In comparison, the adsorbent mix of the present invention adsorbs 14 different classes of antibiotics of 22 antibiotics including but not limited to Cephalosporins, Aminoglycosides, Penicillins, Fluoroquinolones, Macrolides, Anti-Mycobacterials, Beta-lactamase inhibitors, Anti-Fungals, Anti-Virals and Anti-Malarials at varying temperature (room temperature and 60° C.) and pH (acidic, neutral and basic) with a contact time ranging from 1 min to 60 min.

The following literature shows the existing methodology in waste-water treatment—

Waste-water Treatment with Activated Charcoal Produced from Cocoa Pod Husk, International Journal of Environment and Bioenergy, 2012, 4(3): 162-175

Removal of antibiotics from waste-water by adsorption and biodegradation, Doctoral thesis, Nanyang Technological University, Singapore.

Enhanced Removal of Antibiotic in Waste-water Using Liquid Nitrogen-Treated Carbon Material: Material Properties and Removal Mechanisms, Int J Environ Res Public Health, 2018 Nov. 26; 15 (12):2652. doi: 10.3390/ijerph15122652

Strategies to Combat Antibiotic Resistance in the Waste-water Treatment Plants, Front. Microbiol., 17 Jan. 2018

The literature mentioned above demonstrates waste-water treatment using different techniques which are comparatively expensive. Also when compared to the present invention, other adsorbents or techniques found in the literature have not demonstrated effective antibiotic adsorption capacity.

BRIEF DESCRIPTION OF THE DRAWINGS

FIGS. 1A and 1B. Final antibiotic mix before elution (FIG. 1A) and after elution (FIG. 1B) of 14 classes of antibiotics.

DETAILED DESCRIPTION OF INVENTION

Figure 2:
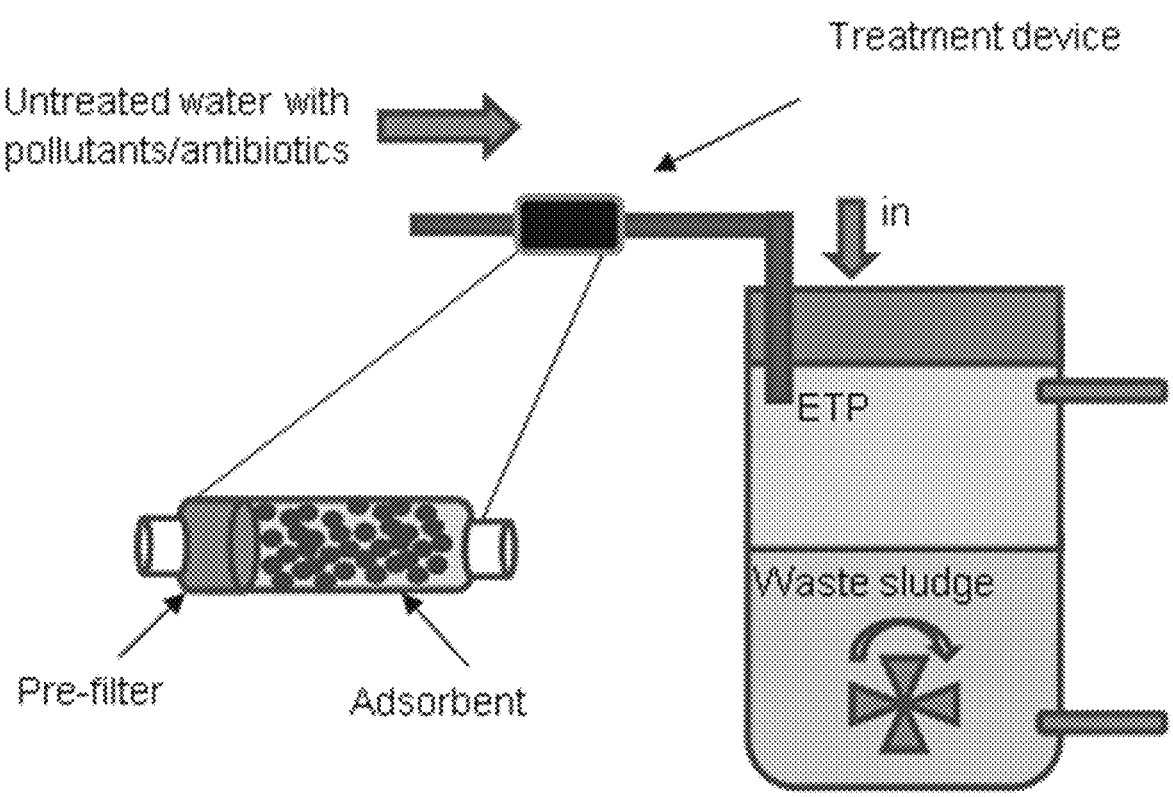
FIG. 2. Effluent/-Antibiotic depleting device

Applicants have developed a mixture of adsorbents originated from common waste materials which are a combination of activated powder or granular charcoal from various sources including but not limited to Coconut shell, Pine Wood, Bamboo, Areca nut and paper. These adsorbents have high adsorption capacity for antibiotics, pathogens and heavy metals. Preliminary data suggests that 1 kg of charcoal mixture can clean up to a maximum volume of 100000 L of effluent water with heavy load of antibiotics consisting of antibiotics including but not limited to Cephalosporins, Aminoglycosides, Penicillins, Fluoroquinolones, Macrolides, Anti-Mycobacterials, Beta-lactamase inhibitors, Anti-Fungals, Anti-Virals and Anti-Malarials.

The adsorbent mixture of the invention is capable of adsorbing a wide variety of antibiotics and contaminants, which includes Cephalexin, Linezolid, Streptomycin, Ampicillin, Amoxicillin, Enrofloxacin, Ciprofloxacin, Moxifloxacin, Erythromycin, Azithromycin, Isoniazid, Rifampicin, Ethambutol, Clofazimine, Tazobactam, Clavulanic acid, Meropenem, Fluconazole, Ketoconazole, Remdesivir, Favipiravir and Chloroquine. Also, the same charcoal mixture of the invention can adsorb a variety of pathogens including but not limited to Bacteria handled in BSL-2 and BSL-3, Viruses including SARS CoV-2 which are not disclosed in any other literature. This invention is also extended to adsorb heavy metals including but not limited to Lead, Copper, Zinc and Chromium using a pre-filter of ion exchange resin as a separate bed along with the proposed charcoal mix. Furthermore, the charcoal mix of the invention with ion exchange resin is also used to adsorb Fluoride, a major contaminant in drinking water.

Silica sand and PEG 3350 at 0.1 to 10-fold of the charcoal mix are some other pre-filters which are used for adsorbing antibiotics and pathogens.

In one embodiment, the invention is a mixture of various charcoal adsorbents including but not limited to areca nut, bamboo, pine nut, coconut shell and paper that can deplete a wide variety of antibiotics in one go. The adsorbent mix is capable of adsorbing antibiotics for repeated elutions (50 in number) and the elution is done at room temperature (24 to 30° C.) and can go up to 60° C. Furthermore, the pH conditions of adsorption are highly flexible ranging from highly acidic, neutral to basic. On comparison with the closest prior art (Xinbo Zhang et al), the present invention is inventive as shown below:

1. The present invention is a mixture of charcoal as compared to the above prior art which is a single powdered activated charcoal (PAC) which has not been defined.
2. The adsorbent mixture of the present invention enables 100% removal of all the 22 different antibiotics as opposed to the above-mentioned prior art (99.6%). The removal efficiency is retained even after multiple passages, i.e., passing the antibiotic solution 50 times through the charcoal mix which clearly demonstrates that the adsorbent mix of the invention has an efficient holding capacity.
3. Also, their treatment method of the prior art is limiting, as it requires specific optimum conditions to pass the antibiotic solution through their PAC, i.e., low pH (acidic) and room temperature whereas the present invention functions efficiently at room temperature as well as up to 60° C. and all pH conditions.
4. The proposed mix depletes 14 different classes of antibiotics as compared to the prior art which demonstrates depleting only 6 classes.

Thus, it is established that the adsorbent mix of the present invention is superior and proves to be novel and not merely an extension in terms of existing prior art.

This single mixture can adsorb a wide variety of antibiotics along with other pollutants including but not limited to heavy metals and pathogens. This concept can be extended to waste-water/effluents depletion from pharmaceutical companies which again are a major cause of concern for developing Antimicrobial Resistance (AMR).

Further, the unique charcoal mix of the invention can be used in places such as hospitals, industries, animal husbandry, pesticidal industries etc. This also can be used at residential premises to obtain clean antibiotic-free water.

The foregoing Examples enable the invention and are provided for better understanding of the invention. This however, cannot be considered as limiting the scope of the invention.

EXAMPLES

Example 1: Adsorption of Antibiotics Using the Adsorbent Mixture of the Invention Experiments were performed using minimum of 500 mg and maximum of 100 gms of charcoal mix with an interaction time of less than a minute going up to 1 hour (Table 1) with the flow rate ranging from 0.5 ml/min to 40 mL/min. The pack size of the charcoal mix can be increased to kilogram levels as well, based on the application and the concentration of antibiotics and contaminants. The experiments were further extended by eluting antibiotic solution mix at room temperature (24-30° C.) and at 60° C. Similar experiments with different pH conditions i.e., ~2.0 and 9.0 were performed to ensure complete depletion at high acidic and basic conditions of antibiotic mix (Table 1). The above parameter proves that the adsorbent can be used at varying temperatures i.e., from room temperature (24-30° C.) to up to 60° C. and in either high acidic, neutral or basic conditions.

The present invention provides a mixture of activated charcoals (powder or granular), originating from various sources like paper, areca nut shell, coconut shell, pine wood, bamboo etc, which are used to evaluate and understand the adsorption capacity for individual or mixture of antibiotics including but not limited to Cephalexin, Linezolid, Streptomycin, Ampicillin, Amoxicillin, Enrofloxacin, Ciprofloxacin, Moxifloxacin, Erythromycin, Azithromycin, Isoniazid, Rifampicin, Ethambutol, Clofazimine, Tazobactam, Clavulanic acid, Meropenem, Fluconazole, Ketoconazole, Remdesivir, Favipiravir and Chloroquine.

The adsorption mixture of the present invention was evaluated in various proportions: Areca nut (0-50%), paper charcoal (0-50%) and Coconut shell, Pine wood and Bamboo charcoal, each in the range of 10-90% each. Table 1 shows antibiotic mix (2 mg/ml of each antibiotic) containing 22 antibiotics which was passed through the charcoal mixture of the invention for 50 elutions repeatedly. Along with the charcoal mix, Silica Sand and PEG 3350 combinations (0.1-10-fold of Charcoal mix) were also explored as prefilter to remove any extraneous material in waste-water.

TABLE 1

| Antibiotic mix (2 mg/ml of each antibiotic) containing 22 antibiotics | | | | | | |
|---|---|---|---|---|---|---|
| | | Temperature | | pH | | Interaction Time |
| S. No | Antibiotics | Room temperature | 60° C. | Acidic (2.0) | Basic (9.0) | 1 minute | 60 minutes |
| 1 | Cephalexin | ND | ND | ND | ND | ND | ND |
| 2 | Linezolid | ND | ND | ND | ND | ND | ND |
| 3 | Streptomycin | ND | ND | ND | ND | ND | ND |
| 4 | Ampicillin | ND | ND | ND | ND | ND | ND |
| 5 | Amoxicillin | ND | ND | ND | ND | ND | ND |
| 6 | Enrofloxacin | ND | ND | ND | ND | ND | ND |
| 7 | Ciprofloxacin | ND | ND | ND | ND | ND | ND |
| 8 | Moxifloxacin | ND | ND | ND | ND | ND | ND |
| 9 | Erythromycin | ND | ND | ND | ND | ND | ND |
| 10 | Azithromycin | ND | ND | ND | ND | ND | ND |
| 11 | Isoniazid | ND | ND | ND | ND | ND | ND |
| 12 | Rifampicin | ND | ND | ND | ND | ND | ND |
| 13 | Ethambutol | ND | ND | ND | ND | ND | ND |
| 14 | Clofazimine | ND | ND | ND | ND | ND | ND |
| 15 | Tazobactam | ND | ND | ND | ND | ND | ND |
| 16 | Clavulanic acid | ND | ND | ND | ND | ND | ND |
| 17 | Meropenem | ND | ND | ND | ND | ND | ND |
| 18 | Fluconazole | ND | ND | ND | ND | ND | ND |
| 19 | Ketoconazole | ND | ND | ND | ND | ND | ND |
| 20 | Remdesivir | ND | ND | ND | ND | ND | ND |
| 21 | Favipiravir | D | D | D | D | ND** | ND** |
| 22 | Chloroquine | ND | ND | ND | ND | ND | ND |

Note:
ND—Not detected,
D—Detected
**With the scale up protocol (100 gms of charcoal mix), Favipiravir was not detected. This depicts that the adsorption capacity increases when there is an increase in quantity of charcoal mix.

Example 2. Adsorption of Heavy Metals Using the Adsorbent Mixture and Ion Exchange Resin The experiments with charcoal mix and ion exchange resin combination were performed to determine heavy metals adsorption. The procedure is as follows:

1) Heavy metals were prepared from standard solutions with desired concentration i.e., Copper—5 mg/L, Lead—15 mg/L, Zinc—1 mg/L and Chromium—10 mg/L using Milli Q water as diluent.

2) Adsorbent mix was prepared and packed in a suitable container.

3) Above the adsorbent mix, ion exchange resin was placed with the proportion of 0.1 to 1.

4) The prepared heavy metals standard solution mix was then passed through the adsorbent mix and the eluent was collected in a separate container.

5) The eluent was analyzed using ICP-MS for the potential heavy metal determination.

6) The standard solution which was not passed through the adsorbent mix was used as reference control.

7) The obtained results were compared for before and after elution of the standard solution.

Example 3. Adsorption of Fluoride Using the Adsorbent Mixture and Ion Exchange Resin 1) Fluoride was prepared from standard solutions with desired concentration i.e., 5 mg/L using Milli Q water as diluent.

2) The solution was adjusted to pH-2.0 and pH-7.0 using 0.1N HCl.

3) Adsorbent mix was prepared and packed in a suitable container.

4) Above the adsorbent mix, ion exchange resin was placed as a separate bed with the proportion of 0.1 to 1.

5) The prepared Fluoride standard solution mix i.e., standard solution was adjusted to pH 2.0 and 7.0 and passed through a.) adsorbent mix alone and b.) adsorbent mix with ion exchange resin.

6) The eluent was collected in a separate container.

7) The eluent was analyzed using UV absorbance method for Fluoride determination.

8) The standard solutions which were not passed through the adsorbent mix was used as reference control.

The obtained results were compared for before and after elution of the standard solution. The results for a) Heavy Metals and b) Fluoride are as shown in Table 2a and 2b.

Table 2:

| a) Evaluation of Charcoal mix with ion exchange resin for heavy metal adsorption | | | |
|---|---|---|---|
| Heavy Metals | Reference Control (Without Elution) | Reference Control Eluted Through Charcoal Mix with Ion Exchange Resin | Industry Waste-Water Sample | Industry Waste-Water Eluted Through Charcoal Mix with Ion Exchange Resin |
| Copper as Cu, mg/L | 4.03 | <0.05 | 0.05 | <0.05 |
| Lead as Pb, mg/L | 14.3 | <0.05 | <0.05 | <0.05 |
| Zinc as Zn, mg/L | 0.965 | <0.05 | 104.3 | <0.05 |
| Chromium as Cr, mg/L | 11 | <0.05 | 17.45 | 0.05 |

| b) Evaluation of Charcoal mix with ion exchange resin for Fluoride adsorption | | | |
|---|---|---|---|
| Fluoride | Before Elution (Control) mg/L | Elution using Charcoal Mix mg/L | Elution using Charcoal Mix and Ion Exchange Resin mg/L |
| Standard Solution- 5 mg/L | 4.18 | 1.20 | 0.68 |
| Std. Solution 5 mg/L, pH-2.0 | 4.53 | 1.11 | 1.16 |
| Std. Solution 5 mg/L, pH-7.0 | 5.07 | 1.12 | 0.70 |

After determination of the eluent for antibiotics, it was found that charcoal mix was adsorbing almost all the antibiotic molecules (FIG. 1). Hence, charcoal mix was finalized in which the antibiotic mix was passed through with at least 10 mL/min to maximum of 40 mL/min interaction time. However, minimum and maximum volume for interaction time may vary based on the quantity of charcoal mix used.

Example 4. Depletion of Antibiotics Using the Adsorbent Mix in a Field-Deployable Device With a view to develop a field-deployable device to deplete antibiotics from the effluent, charcoal mix (100 gm) was packed in ceramic funnel and a specified volume of at least 10 mL/min to 20 mL/min of high concentration antibiotics mix was passed through the charcoal mix and collected at regular intervals. The procedure is as follows:

c) Twenty-two antibiotic compounds were weighed and dissolved in an appropriate solvent to achieve a concentration of 2 mg/mL for each antibiotic.

d) Total volume of 1000 ml was prepared using water as diluent.

e) Charcoal was weighed for 100 gms and filled in the Buchner ceramic funnel. The filtration unit was set up to elute 1000 mL of antibiotics mix.

f) The charcoal mix was then equilibrated with the antibiotic mix to be eluted.

g) Antibiotic mix (20 mL) was passed through the charcoal mix to achieve 20 mL/min elution time.

h) After every $5^{th}$ elution, sample was collected and analysed using LC-MS/MS.

The LC-MS/MS (as per Supplement) based evaluation of eluent demonstrated an immediate adsorption of material with 50 multiple passages. The minimum adsorption capacity of adsorbent material was calculated as at least 200 mg/gm with a continuous flow.

Based on the data, it is evident that the charcoal mix has the potential to deplete a high load of antibiotics from water. Furthermore, a treatment device (FIG. 2) has been developed by the applicants for field use.

The device consists of charcoal mix packed in a cylindrical shaped container which can be fixed to pipeline before entering in Effluent Treatment Plant (ETP). Based on the requirement, pre-filters are used along with the charcoal mix, for eg. while testing heavy metals in the waste-water. Ion exchange resin is used as a pre-filter for adsorption in combination with charcoal mix. According to flow of waste-water, a positive or negative pressure is applied for uninterrupted elution.

Example 5. Adsorption of Pathogens Using the Adsorbent Mixture of the Invention The charcoal mix of the invention was used for eluting a mixture of pathogens such as Methicillin-resistant *Staphy-*

*lococcus aureus* (MRSA), *Enterococcus faecalis, Escherichia coli, Staphylococcus aureus* etc., through the adsorbent. The procedure is provided as follows—

Mueller Hinton broth (media with nutrients for bacterial growth) was used as a control. 3 mL of bacterial pathogens (@ inoculum of $3\text{-}7\times10^5$ cfu/mL) passed through different charcoal combinations.

The charcoal mix of the invention was used for eluting SARS CoV2. The virus mixture was prepared in DMEM at $\log_{10} 10^{\wedge}9$ PFU/mL. The virus mixture was passed through the adsorbent mix and eluent was collected. The eluent was then serially diluted (log dilution) to check the virus titer by standard CPE assay. The virus mixture (not passed through the column) was used as a control.

The filtrate was collected and enumerated for residual bacterial load (Table 3a) and virus load (Table 3b).

TABLE 3a

Evaluation of charcoal mix for removal of pathogens

| Pathogen | Residual Microorganisms (CFU/mL) | Log Reduction (CFU/mL) | Comments |
|---|---|---|---|
| Bacteria | 0 | $10^5 \log_{10}$ | 100% removal. No bacterial growth observed in the filtrate of Charcoal matrix |

TABLE 3b

Evaluation of charcoal mix for removal of virus

| Sl No | Sample | No. of plaques 1 | 2 | Avg. | Dilution Factor | Vol. of virus used for infection (mL) | PFU/mL | Log PFU/mL | Log reduction of Virus load | % reduction of virus load |
|---|---|---|---|---|---|---|---|---|---|---|
| 1 | Cells only (Vero E6 Cell Lines) | 0 | 0 | 0 | N/A | N/A | N/A | N/A | N/A | N/A |
| 2 | Virus control | 7 | 6 | 6.5 | 10 | 0.045 | 1444.44 | 3.16 | N/A | N/A |
| 3 | Pass through solution (Charcoal pack) | 4 | 5 | 4.5 | 10 | 0.045 | 1000 | 3.00 | 0.16 | 30.77 |

Note:
Vero E6 Cell lines were used as negative control i.e., without virus infection.
Virus control was used as positive control i.e., medium with virus.
30.77% reduction in virus load was observed when compared to control.

This proves that the capability of adsorbent extends in depleting the pathogens as well. This demonstrates that the novel adsorbent device can be used in various fields which are generating enormous effluent contaminated with Bacteria and Viruses.

Waste-waters are highly dynamic as both its characteristics and composition vary over time, which creates significant challenge to ensure devices/technologies that remediate pollutants are designed for optimal removal. The present invention (adsorbent mix) aims at efficiently adsorbing a wide variety of antibiotics, heavy metals and pathogens from waste-water, thus, providing an effective solution to mitigate the risk of spreading pollutants into the environment.

We claim:

1. An adsorbent mixture for depleting effluents from water sources, the adsorbent mixture comprising:
    a charcoal mix, wherein the charcoal mix consists of activated charcoal originating from a combination of coconut shells, pine wood, and bamboo; and
    a pre-filter comprising a combination of silica and PEG 3350, wherein the combination of silica sand and PEG 3350 is at 0.1 to 10-fold of the charcoal mix.

2. The adsorbent mixture for depleting effluents as claimed in claim 1, wherein the charcoal mix consists of 10-90% coconut shell, 10-90% pine wood, and 10-90% bamboo.

3. The adsorbent mixture for depleting effluents as claimed in claim 1, wherein the effluents are selected from the group consisting of antibiotics, pathogens anti-fungal, anti-viral and anti-malarial.

4. The adsorbent mixture for depleting effluents as claimed in claim 3, wherein the antibiotics are selected from the group consisting of Cephalexin, Linezolid, Streptomycin, Ampicillin, Amoxicillin, Enrofloxacin, Ciprofloxacin, Moxifloxacin, Erythromycin, Azithromycin, Isoniazid, Rifampicin, Ethambutol, Clofazimine, Tazobactam, Clavulanic acid, Meropenem, Fluconazole, Ketoconazole, Remdesivir, Favipiravir and Chloroquine.

5. The adsorbent mixture for depleting effluents as claimed in claim 3, wherein the pathogens are selected from the group consisting of bacteria and viruses.

6. The adsorbent mixture for depleting effluents as claimed in claim 1, wherein the adsorbent mixture adsorbs antibiotics, and pathogens from water sources at a temperature in a range of 24° C. to 60° C. and at a pH ranging from acidic, neutral to basic.

7. The adsorbent mixture for depleting effluents as claimed in claim 1, wherein the adsorbent mixture is packed in a field-deployable device, wherein the device is fixed to a pipeline before entering in Effluent Treatment Plant (ETP).

8. An adsorbent mixture for depleting heavy metals, and fluoride from water sources, the adsorbent mixture comprising:
    a charcoal mix, wherein the charcoal mix consists of activated charcoal originating from a combination of coconut shells, pine wood, and bamboo; and
    a pre-filter comprising an ion exchange resin, wherein the ion exchange resin is at 0.5 to 2-fold of the charcoal mix.

9. The adsorbent mixture for depleting heavy metals and fluoride from water sources as claimed in claim 8, wherein the charcoal mix consists of 10-90% coconut shell, 10-90% pine wood, and 10-90% bamboo.

10. The adsorbent mixture for depleting heavy metals and fluoride from water sources as claimed in claim 8, wherein the heavy metals are selected from the group consisting of lead, copper, zinc and chromium.

11. The adsorbent mixture for depleting heavy metals and fluoride from water sources as claimed in claim 8, wherein the adsorbent mixture adsorbs heavy metals and fluoride from water sources at a temperature in a range of 24° C. to 60° C. and at a pH ranging from acidic, neutral to basic.

* * * * *